Feb. 3, 1925.                                                          1,525,139
V. LINK
STEERING GEAR SUPPORTING MEANS
Filed Nov. 10, 1921
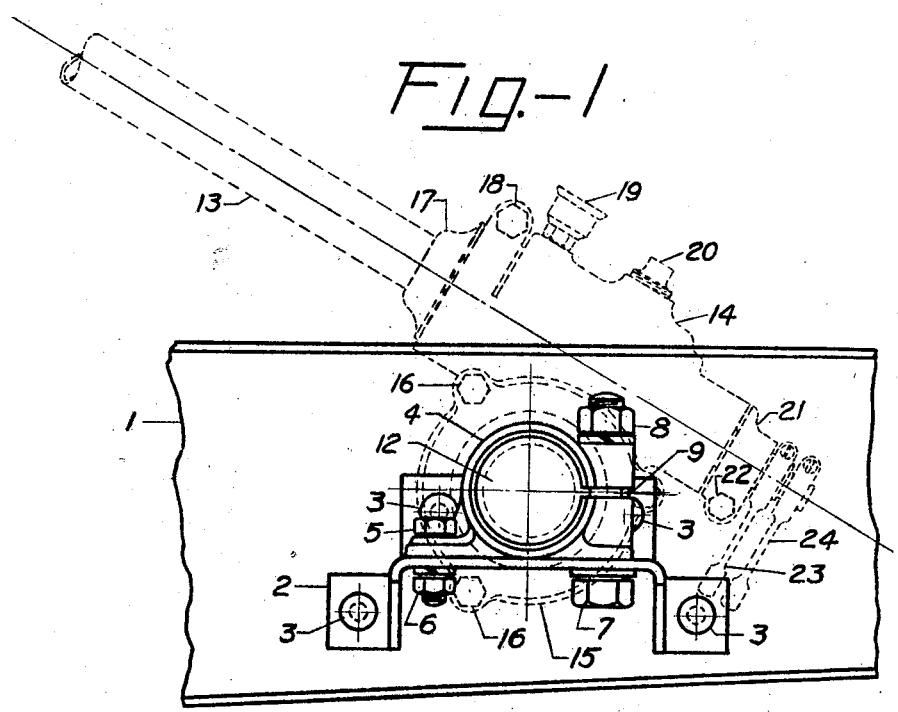
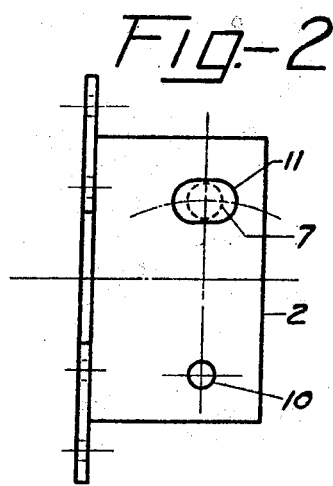
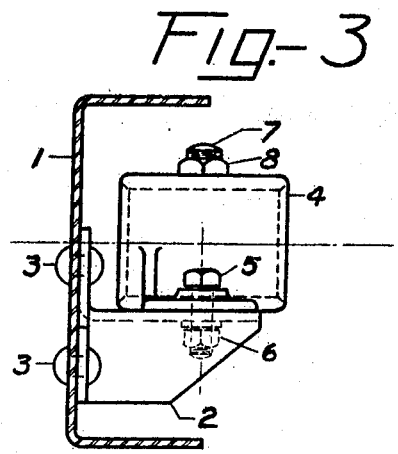
INVENTOR
VINCENT LINK.
BY
William MacGlashan
ATTORNEY Patented Feb. 3, 1925.

1,525,139

UNITED STATES PATENT OFFICE.

VINCENT LINK, OF DETROIT, MICHIGAN, ASSIGNOR TO STUDEBAKER CORPORATION, A CORPORATION OF NEW JERSEY.

STEERING-GEAR-SUPPORTING MEANS.

Application filed November 10, 1921. Serial No. 514,377.

*To all whom it may concern:*

Be it known that I, VINCENT LINK, a citizen of the United States of America, and resident of Detroit, in the county of Wayne and State of Michigan, have invented certain new and useful Improvements in Steering-Gear-Supporting Means, of which the following is a specification.

My invention relates to supports for steering gears of automobiles and the object is to provide a support that will give universal adjustment of the steering post.

It is customary to provide either a support allowing no adjustment, or a support providing for up and down adjustment of the steering post of automobile steering gears. The latter is obtained by pivoting the steering gear in its support in a substantially horizontal bearing at right angles to the steering post. Where no adjustment is provided for horizontal adjustment there is considerable difficulty in assembling the steering gear to the chassis due to the fact that the steering post will not always line up with the opening in the dash thru which it passes, due to variations in the different parts, causing it to bind either on the sides, top, or bottom. Where up and down adjustment is provided, any inaccuracy or variations in parts or in the assembling of parts can be taken care of in the direction of the adjustment but still leaving the liability of binding on the sides.

My invention provides a support for the steering gear which allows universal adjustment of the steering post, making it capable of being adjusted to properly fit any opening in the dash within comparatively large limits. The up and down adjustment is taken care of in the conventional way as described above. The side adjustment which this invention deals with primarily is taken care of in a different manner. The steering gear support is composed of a support proper fitting on a bracket having a substantially horizontal face. The support proper has a horizontal bore in which the arm or pin of the steering gear is journaled to allow up and down adjustment of the steering post, and the support proper is adjustably secured to the bracket by two bolts. One of the holes in the bracket for these bolts is of the conventional round punched or drilled type, the other is arcuate in shape, the center of the arc being the center of the other bolt hole. This allows the support proper and therefore the entire steering gear to pivot about the first mentioned bolt hole, providing for side adjustment of the steering post.

In order to better describe my invention I will now refer to the accompanying drawing in which:

Figure 1 is a side view of a steering gear support embodying my present invention as it appears in place on the side member of an automobile frame, with a conventional type of steering gear shown in connection therewith by dotted lines.

Figure 2 is a top view of the bracket which supports and upon which is pivoted, the support proper.

Figure 3 is an end view of the support as it appears in place on the side member of an automobile frame.

Referring to the numbered parts of the drawing in which like numerals refer to like parts throughout the several views—

"1" is a side member of an automobile frame. "2" is a bracket fastened to the frame member "1" by the rivets "3". "4" is a steering gear support pivotally secured to the bracket "2" by the bolt "5" and nut "6" and clamped in adjusted position by the bolt "7" and nut "8". The support "4" is split at "9" in order that the arm or pin "12" of the steering gear about which the steering gear pivots for up or down adjustment of the steering post "13" may be rigidly held when the nut "8" is drawn down on the bolt "7". The bolt "5" passes thru the hole "10" of the bracket "2", and axial movement only of the bolt "5" being provided for. The bolt "7" passes thru the opening "11" of the bracket "2" and as the opening "11" is arcuate in shape as shown with the center of its arc at the center of the hole "10" the bolt "7" is allowed to move in the opening "11" around "10" as a center. Any movement of the bolt "7" and therefore of the support "4" and steering gear in general which, is pivoted about the bolt "5" in the hole "10" gives the steering post "13" a sidewise adjustment. The steering post "13" is therefore capable of both sidewise and up or down movement, having a universal action which makes it capable of moving to fit any opening in a dash within reasonable limits. The steering gear assembly which is shown in dotted lines comprises an arm or pin 12 upon which the steering gear is pivoted for up and down movement and which is journaled in the support 4, a steering gear post 13, a casing 14, a cover 15 for the casing 14 which is secured thereto by the screws 16, an adjusting nut 17 for the bearings within the casing 14 which is locked in place by the bolt 18, an oil cup 19, a plug 20, a collar 21 on the end of steering gear which is secured by the bolt 22, and levers 23 and 24 for controlling the spark and throttle of the engine.

Formal changes may be made in the specific embodiment of the invention described without departing from the spirit or substance of the broad invention, the scope of which is commensurate with appended claims.

What I claim is:

1. In a steering mechanism, the combination of an automobile frame member, a steering gear assembly, a support for said steering gear assembly, means for securing said support to said frame member, a pin on said means about which said steering gear assembly is adapted to be pivoted in a horizontal direction, and means for locking said assembly against movement in a horizontal direction.

2. In a steering mechanism the combination with an automobile frame member and a steering gear assembly, of means for supporting said steering gear assembly on said frame member, said means comprising a bracket having a substantially horizontal opening therein, a projection on said steering gear assembly adapted to be inserted in said opening and pivot therein, a substantially vertical pin about which said bracket may pivot, and means for clamping said bracket in a plurality of positions.

3. In a steering mechanism, the combination of an automobile frame member, a steering gear assembly, a bracket in which said steering gear assembly is pivotally supported, and a second bracket secured to said frame member and having a portion projecting therefrom to support said first bracket, and means for pivotally supporting said first bracket thereon.

4. In a steering mechanism, the combination with an automobile frame member having a substantially vertical face, a steering gear provided with a horizontally projecting arm, and a bracket provided with an opening to receive and support said arm, and further provided with a horizontal face, of a second bracket having a vertical face and a horizontal face, said vertical face being secured to the vertical face of said frame member, said horizontal face being adapted to receive the horizontal face of said first mentioned bracket, means whereby said first mentioned bracket is pivotally supported on said second bracket, and means for locking said first mentioned bracket in a plurality of positions.

5. The combination with a frame side member of an automobile, a steering gear assembly, a supporting bracket in which said steering gear assembly is pivoted for movement in an approximately vertical plane, and a second bracket fastened to said frame side member and adapted to support said first named supporting bracket, and means to adjust said first named bracket in relation to said second named bracket.

6. In an automobile, a frame side member, a bracket having a substantially horizontal face secured thereto, a steering gear assembly, a supporting member adapted to adjustably support said steering gear assembly for movement in an approximately vertical plane, and means for pivotally securing said supporting member on said bracket for movement in an approximately horizontal plane.

Signed by me at Detroit, Michigan, U. S A., this 8th day of November, 1921.

VINCENT LINK.

Witnesses:
ELMER L. MCINTYRE.
HODGSON S. PIERCE.